(12) United States Patent
Van Straten

(10) Patent No.: US 9,623,790 B2
(45) Date of Patent: Apr. 18, 2017

(54) LIGHT RETAINER ASSEMBLY AND HEATED LIGHT ASSEMBLY

(71) Applicant: George A. Van Straten, Chassell, MI (US)

(72) Inventor: George A. Van Straten, Chassell, MI (US)

(*) Notice: Subject to any disclaimer, the term of this patent is extended or adjusted under 35 U.S.C. 154(b) by 177 days.

(21) Appl. No.: 14/465,715

(22) Filed: Aug. 21, 2014

(65) Prior Publication Data
US 2015/0055363 A1    Feb. 26, 2015

Related U.S. Application Data

(60) Provisional application No. 61/868,522, filed on Aug. 21, 2013.

(51) Int. Cl.
| | |
|---|---|
| *F21V 29/00* | (2015.01) |
| *B60Q 1/00* | (2006.01) |
| *F21S 8/08* | (2006.01) |
| *F21V 31/00* | (2006.01) |
| *F21V 29/90* | (2015.01) |
| *F21S 8/10* | (2006.01) |

(52) U.S. Cl.
CPC ......... *B60Q 1/0005* (2013.01); *B60Q 1/0017* (2013.01); *F21S 8/085* (2013.01); *F21S 48/34* (2013.01); *F21V 29/90* (2015.01); *F21V 31/005* (2013.01)

(58) Field of Classification Search
CPC .. H05B 3/84–3/86; F21V 29/10; F21V 29/90; F21S 48/12–48/1291
See application file for complete search history.

(56) References Cited

U.S. PATENT DOCUMENTS

| | | | | |
|---|---|---|---|---|
| 2,878,374 | A * | 3/1959 | Sleichert ................. | F21V 17/04 359/819 |
| 4,128,865 | A * | 12/1978 | Johnson ................... | F21S 48/31 362/306 |
| 4,163,276 | A * | 7/1979 | Tabatchnik-Michaeli | F21V 15/04 362/189 |
| 4,212,051 | A * | 7/1980 | Kulik .................... | B60Q 1/2653 362/278 |
| 4,290,098 | A * | 9/1981 | Pierson ............... | F21S 48/1208 362/362 |
| 4,445,165 | A * | 4/1984 | Sherwood ............. | F21S 48/155 292/307 R |
| 5,203,627 | A * | 4/1993 | Kira ........................ | F21V 15/01 362/285 |
| 6,563,086 | B1 * | 5/2003 | Meirndorf ........... | F21S 48/1233 219/202 |
| 2003/0193808 | A1 * | 10/2003 | Mullen ..................... | F21S 8/02 362/374 |

* cited by examiner

*Primary Examiner* — Mariceli Santiago
(74) *Attorney, Agent, or Firm* — Wells St. John P.S.

(57) ABSTRACT

A light retainer is provided with a grommet having a tubular body with an inner surface providing a cavity with a first inner groove and a second inner groove spaced lengthwise of the body from the first inner groove, the first inner groove configured to receive a heated lens and the second inner groove configured to receive a light. A heated light assembly is also provided with a grommet, a heated lens and a light.

20 Claims, 11 Drawing Sheets

LIGHT RETAINER ASSEMBLY AND HEATED LIGHT ASSEMBLY

RELATED PATENT DATA

This patent application claims priority to U.S. Provisional Patent Application Ser. No. 61/868,522, which was filed Aug. 21, 2013, entitled "Heated Light, Grommet, and Connector Assembly for Vehicles" and which is hereby incorporated by reference.

TECHNICAL FIELD

This disclosure pertains to heated lights and heated lamps. More particularly, this disclosure relates to apparatus for supporting a heated lens in front of a light in order to melt snow and ice and remove condensation from lenses of lights and lighting systems for mobile and stationary applications.

BACKGROUND OF THE INVENTION

Techniques are known for heating lamps and lighting systems. One technique involves providing a heating wire on a back surface of a cover element provided over a vehicle light. However, such a system does not necessarily provide thermal protection for overheating. Secondly, such a system does not readily provide a heated lens to a self-contained light assembly, such as an LED light assembly. For example, FIG. 5 illustrates a prior art light grommet 42 that is received within a cylindrical aperture 40 in a fender panel 38 of a vehicle 36 configured to retain a self-contained LED light assembly 52 between a pair of circumferential and radially inwardly extending flanges 44 and 46. A pair of circumferential and radially outwardly extending flanges 48 and 50 trap grommet within aperture 40 to retain light assembly 52 securely therein. A power supply (or current source) 22, such as a battery and/or alternator powers LED lights in assembly 52. Assembly 52 includes an integrally formed front lens provided over individual LEDs. However, ice or condensation can form over such lens causing obstruction of light there through. A need exists to interchange such a light assembly to provide a heated lens that removes ice and/or condensation from in front of the LED lights, as LED lights do not generally generate as much heat as do traditional incandescent lights. Such a system does not necessarily provide an ability to modify an existing lamp by merely replacing an existing lamp bulb with a new lamp assembly and grommet that heats the lens sufficient to melt snow and/or ice from the lens. Finally, the recent adoption of LED lighting systems, which generate very little heat, increases the problem of snow and ice accumulating on the lens of such a lighting system. Accordingly, improvements are needed to better enable removal of ice, snow and condensation from lenses of lights and lighting systems.

SUMMARY OF THE INVENTION

A heated light is provided with a heating wire in a lens that is supported within a light mounting grommet in front of an LED light assembly in order to defrost and clear moisture and/or ice that can cover the lens with snow, ice, or vapor. By heating the lens, accumulation of snow, ice, or vapor is mitigated or eliminated from a surface of the lens, thereby enabling light to transmit through the lens. Applications include lamps and bulbs on conveyance devices, including vehicles, boats, planes, and trains, as well as sedentary structures, such as lamp posts, street lights, railroad crossing markers and lights, and airport ground and runway lighting systems.

According to one aspect, a light retainer is provided with a grommet having a tubular body with an inner surface providing a cavity with a first inner groove and a second inner groove spaced lengthwise of the body from the first inner groove, the first inner groove configured to receive a heated lens and the second inner groove configured to receive a light.

According to another aspect, a heated light assembly is provided having a grommet, a heated lens, and a light. The grommet has a tubular body with an inner surface providing a cavity with a first inner groove and a second inner groove spaced lengthwise of the tubular body from the first inner groove. The heated lens is carried in the first groove. The light is carried in the second groove.

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

Figure 1:
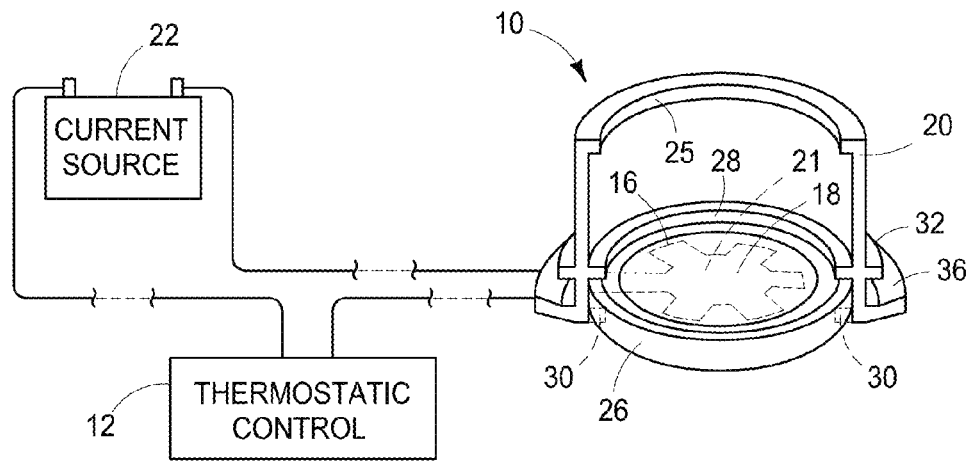
FIG. 1 is a simplified and partially removed perspective view of a heated vehicle tail light assembly with tail lamp removed according to one aspect with a current source and a thermostatic control.

This disclosure is submitted in furtherance of the constitutional purposes of the U.S. Patent Laws "to promote the progress of science and useful arts" (Article 1, Section 8).

FIGS. 1-4 and 6 illustrate in simplified form a first version of a heated light assembly 10. A mounting grommet 20 made of rubber or some other resilient silicon or synthetic material is provided for mounting a heated lens 16 over a lamp or light 52 (see FIG. 6) or 54 (see FIG. 8) in order to provide additional heat for melting any snow and/or ice that would otherwise build up on the light and obstruct light transmission during inclement or winter weather. A current source 22, such as a vehicle battery or alternator provides power to operate the heated lens 16 via a thermostatic control 12. Lens 16 has a heating wire 14 embedded therein (see FIGS. 3 and 4) for heating lens 16 during inclement weather.

An electrical wiring harness (not shown) from the vehicle provides power to operate the light and heat the light assembly in an effort to remove presence of ice in the form of snow, graupel, hail or frost from a lens surface on the tail light assembly. Optionally, heated lamp 10 can be any of a number of lamps or lights, including side marker lights, head lights, cab lights, brake lights, or any other form of light on any type of conveyance or vehicle including ATVs, snowmobiles, boats, planes, cars, trucks, trains and other forms of transportation requiring a lens heater for removing accumulated snow and/or ice on operating lights associated with the conveyance. Furthermore, heated lamp 10 can be used on other lighting systems including sedentary structures, such as lamp posts, street lights (see FIGS. 7 and 8), railroad crossing markers and lights, and airport ground and runway lighting systems. Furthermore, the embodiments depicted in FIGS. 9-17 can also be used on such lighting systems.

Figure 3:
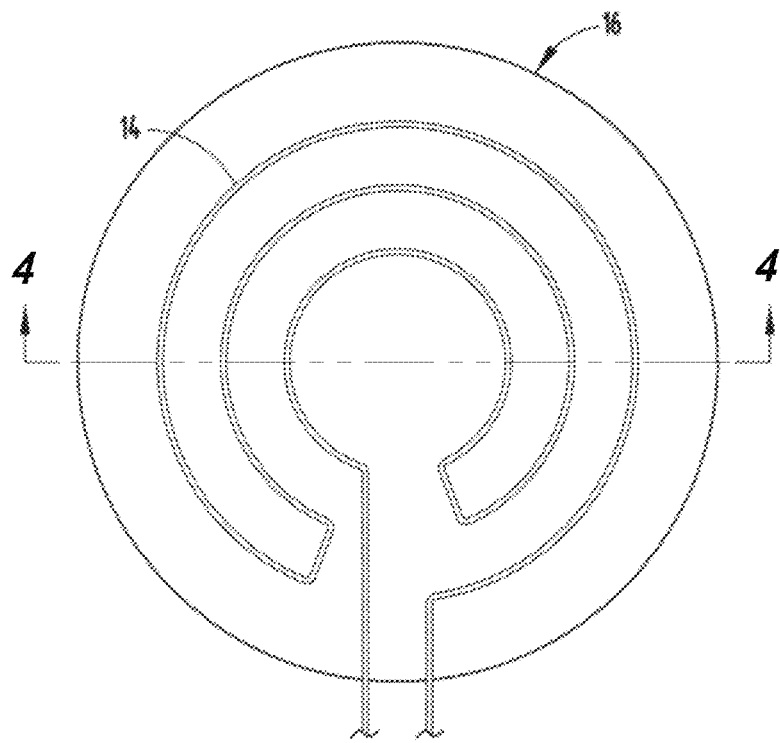
FIG. 3 is a plan view of the lens and heating wire of FIGS. 1-2 showing placement of the wire within an inside surface of the lens.
Figure 4:
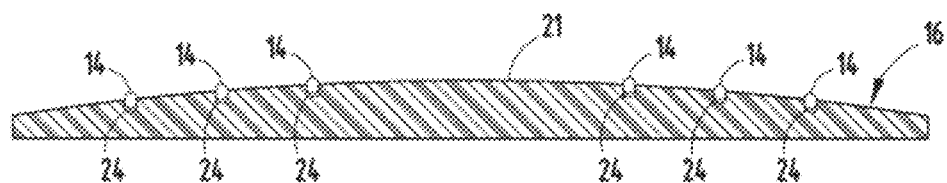
FIG. 4 is a centerline sectional view taken along line 4-4 of FIG. 3.
Figure 5:
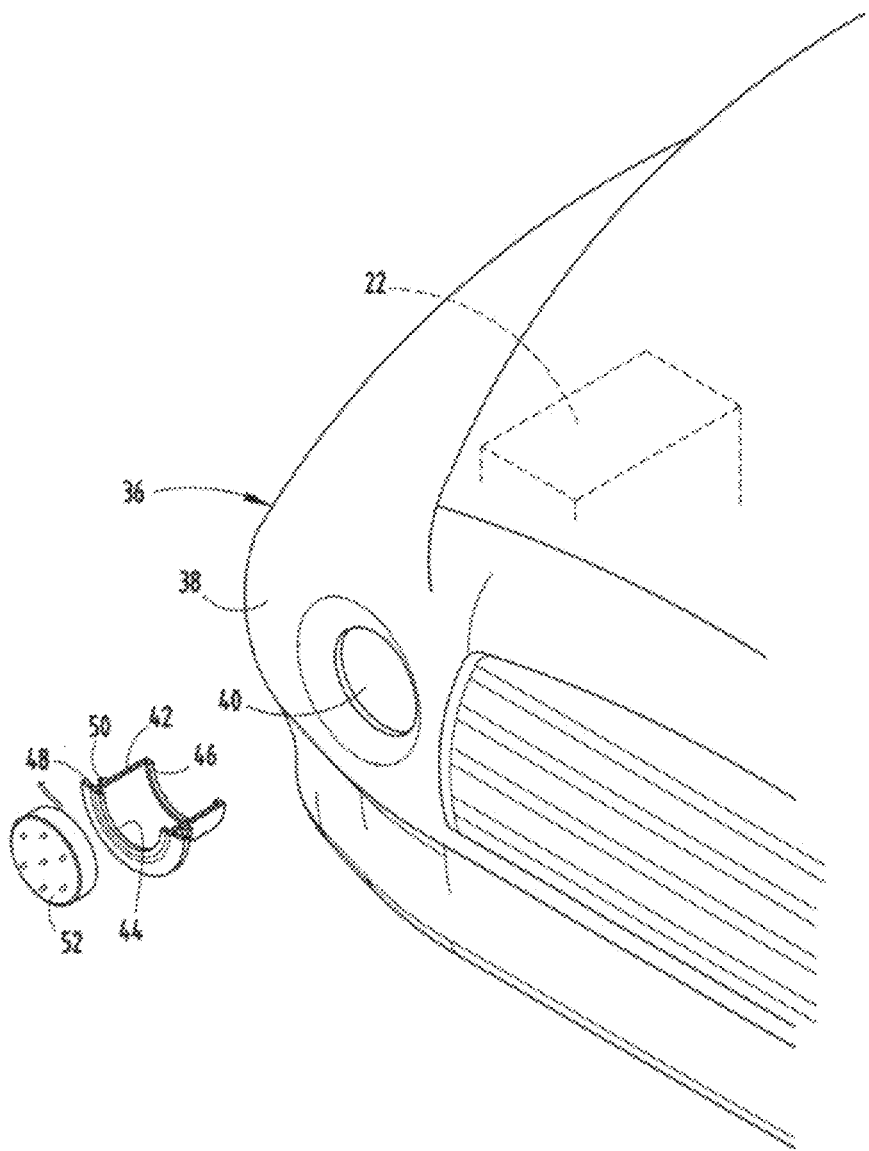
FIG. 5 is a perspective view from above with portions removed of a prior art vehicle head light and lamp system using a traditional rubber mounting grommet and having an LED light carried in the grommet.

In one case, heating wire 14 of FIGS. 1 and 3 comprises a Nichrome heating wire (or Nichromium wire) with a thermistor physically crimped to one end of the wire to provide an electrically conductive connection. As shown in FIGS. 3 and 4, wire 14 is physically press-fit into a complementary groove 24 formed in inner surface 21 of lens 16. Optionally, a PTC thermistor alloy resistance wire can be substituted for wire 14 and thermostatic control 12 (of FIG. 1). Thermostatic control 12 can also be provided by a thermistor (or thermal resistor). Further optionally, one or more conductive traces made from Indium Tin Oxide (ITO), a heat resistant film, can be deposited as a thin film directly onto surface 21 of lens 16, or is deposited onto a layer that is subsequently adhesively affixed onto such surface. One suitable optional wire is sold as PTC Thermistor Alloy Resistance wire, sold by Senphus, Jiangyin Senphus Electrical Material Co., Ltd., No. 8, Taoyuan Rd., Chengchang Industrial Park, Huangtu Town, Jiangyin City, Jiangsu Province, China. Optionally, the thermistor can be replace with any form of thermostat, or with a thermocouple, or resistance temperature detector (RTD) and associated control circuitry, or other thermostat capable of limiting maximum heat output and providing thermostatic control to activate heat delivery from wire 14 to lens 16. Lens can be either plastic or glass, or some other suitable optically transmissible material. Lens 16 can also be clear, or can be tinted a color, such as red, yellow, or blue, and includes a light-transmitting portion 18.

Figure 2:
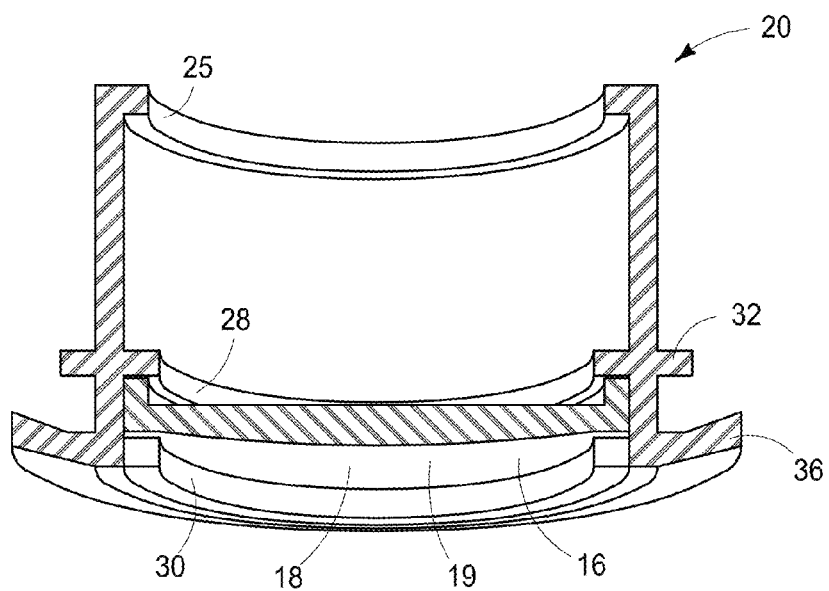
FIG. 2 is an enlarged perspective view from below of the grommet and heated lens assembly of FIG. 1.

Grommet 20 of FIGS. 1 and 2 includes a retention ring 30 that is secured via snap-fit or via fasteners to an inner surface of grommet body 20, inboard of flange 34. Grommet 20 is retained to a vehicle in an aperture that is trapped between flanges 32 and 34. An LED light (not shown) is then retained between flanges 26 and 28 by urging the rubber flange 26 and inserting the LED light therein. Grommet 20 has a first radially-extending groove on an inner surface and configured to receive a heated lens, and a second radially-extending groove on spaced axially on an inner surface from the first groove and configured to receive a light or lamp module, such as an LED light. An outer surface 19 of lens 16 mates with ring 30 and an inner surface 21 of lens 16 is provided proximate flange 28. Furthermore, grommet 20 includes a pair of radially-extending grooves on an outer surface and spaced axially apart to receive a flange provided by an aperture in a structure to which the grommet is mounted. For example, a sheet metal aperture on a bumper is received between flanges 32 and 34 to retain the grommet, LED lamp, and heated lens to the vehicle.

Figure 6:
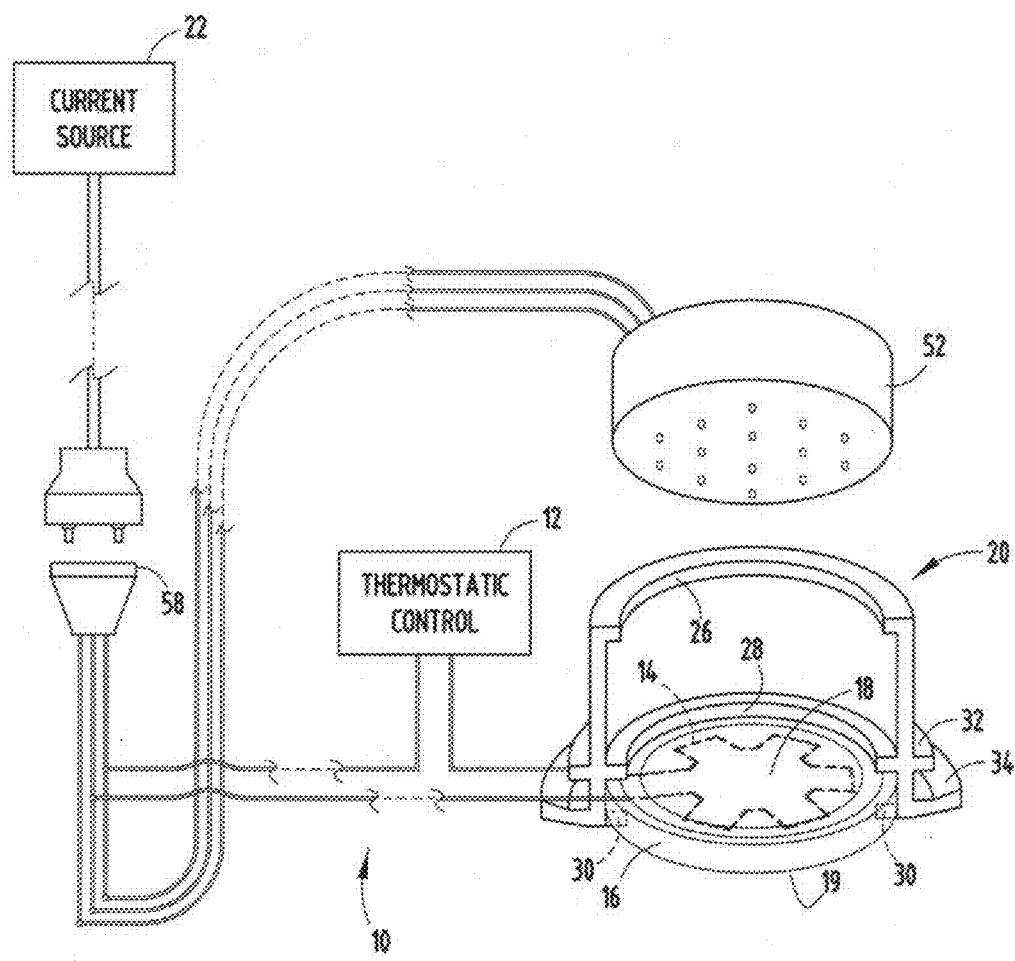
FIG. 6 is a perspective view from below with portions removed of a vehicle light and lamp system using a rubber mounting grommet and heated lens for use on any vehicle light including head lights and tail lights.

FIG. 6 further illustrates details of heated light assembly 10 including thermostatic control 12, current source 22, mounting grommet 20, and LED lamp 52. An electrical connector assembly 58 enables mating and demating of current source 22 from lamp 52 and heating wire 14. Lamp 52 is urged past flange 26, in assembly, between flanges 26 and 28. Lens 16 is assembled between flanges 28 and 30. Finally, flanges 32 and 34 capture a rim flange of a structural aperture to retain the light assembly 10 to the structure, such as a vehicle.

Figures 7, 8:
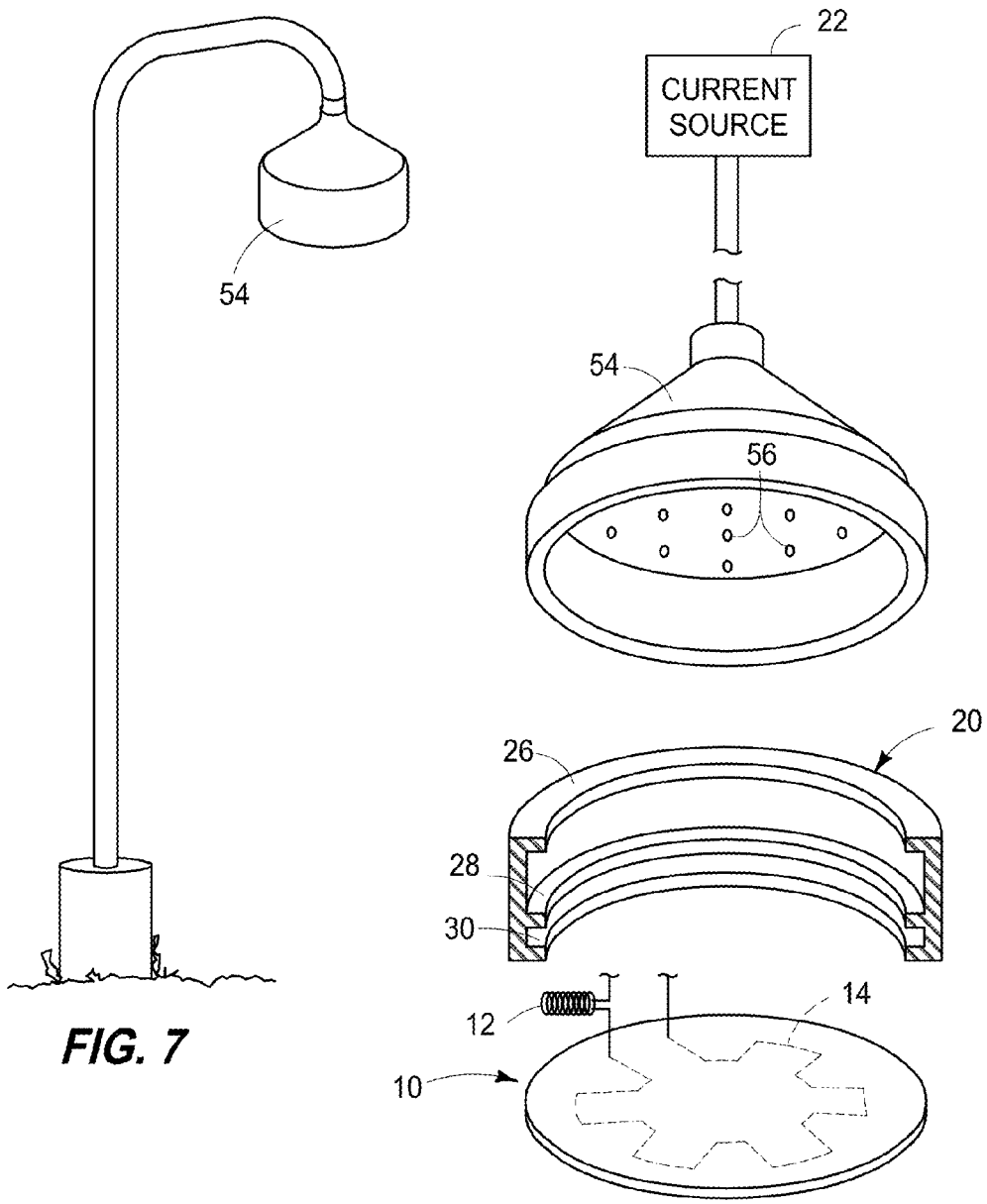
FIG. 7 is a perspective view of a street light.
FIG. 8 is a perspective view from below of the lamp portion of the street light of FIG. 7 having a housing rim flange configured for receiving a rubber mounting grommet and heated lens similar to that depicted in FIG. 6 to heat a lens covering an LED light on the lamp according to another version.

In the case of a street light of FIG. 7, a lamp housing 54 has a cylindrical outer shape that fits in the second groove provided by flanges 26 and 28 (see FIG. 8), thereby providing a heated lens over an LED street light that is protected from accumulation of snow and/or ice during inclement or winter weather. A heated lens 16 is retained between flanges 28 and 30. Individual LED lights 56 pass light through heated lens 16 even during inclement weather.

Figure 9:
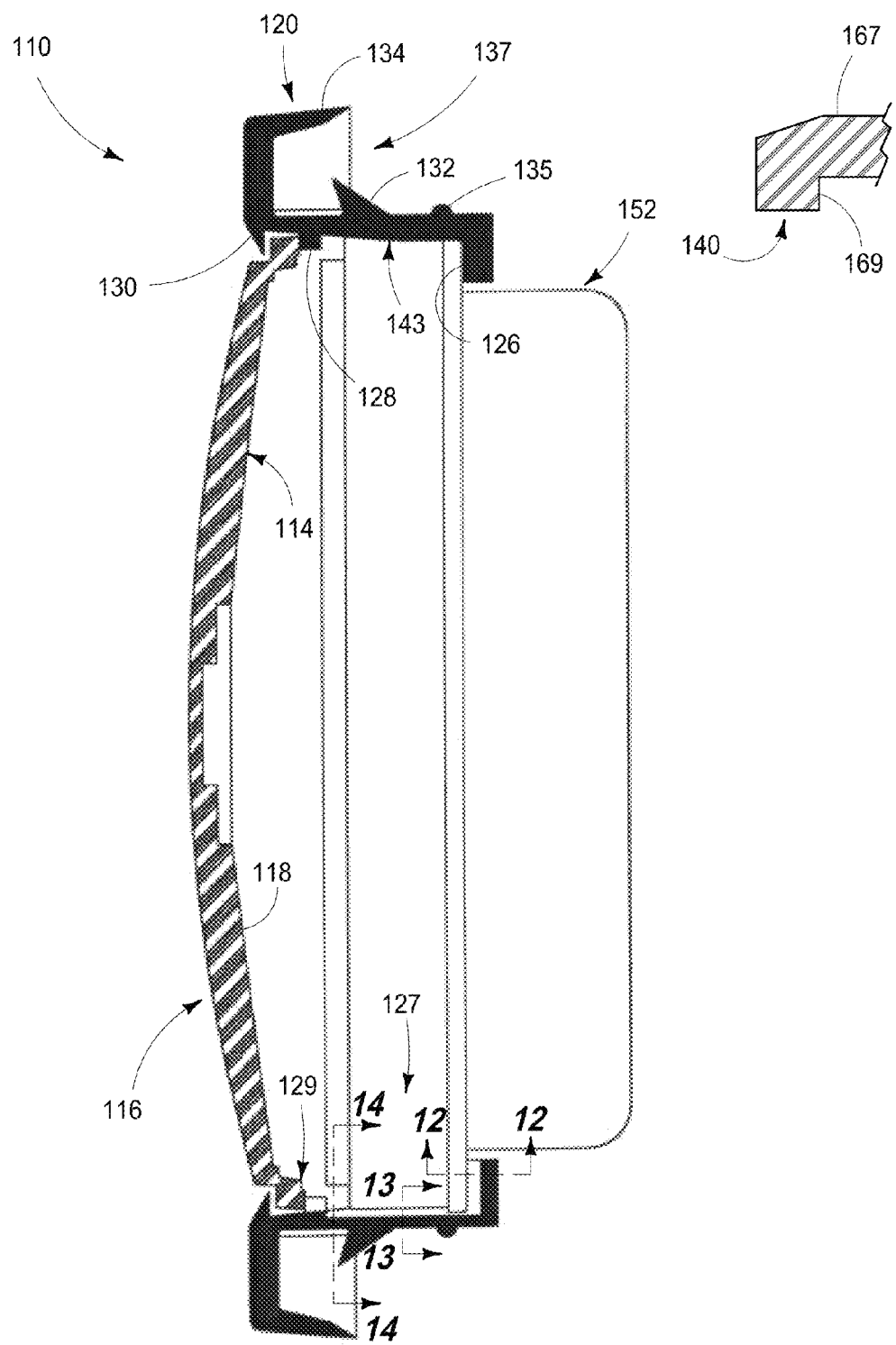
FIG. 9 illustrates another version of a round heated vehicle tail light assembly, similar to the assembly depicted in FIGS. 1-4 and 6, but in greater detail generated to scale from engineering drawings and depicting a grommet in centerline sectional view for supporting an LED light assembly and a heated lens covering the LED light assembly to enable heat removal of snow and/or ice that would otherwise build up on the LED light and obstruct light output.

FIG. 9 illustrates another version of a round heated vehicle tail light assembly 110, similar to the assembly depicted in FIGS. 1-4 and 6, but in greater detail generated to scale from engineering drawings and depicting a grommet in centerline sectional view for supporting an LED light assembly and a heated lens covering the LED light assembly to enable heat removal of snow and/or ice that would otherwise build up on the LED light and obstruct light output. More particularly, a round resilient rubber, or synthetic rubber mounting grommet 120 retains a heated lens 116 optically in front of an LED light (or lamp assembly) 152. Lens 116 is retained in assembly between a pair of first and second circumferential flanges 128 and 130 extending generally radially inwardly from an inner surface 143. Lamp 52 is retained in assembly between a pair of the second flange 128 and a third circumferential flange 126 extending generally radially inwardly from the inner surface 143. A cavity 151 (see FIGS. 10 and 11) is provided within grommet 120 having a first inner groove 129 and a second inner groove 127 spaced lengthwise of the body from the first inner groove 129.

As shown in FIG. 9, a rim flange, or bezel, 134 is formed on a radial outer edge of grommet 120. Rim flange 134 has an angled end portion that cooperates with an angled flange 132 to form a receiving groove 137 that receives in urged relation, during assembly, a cylindrical structural rim 167 on a structure, such as a vehicle bumper or body. Rim 167 terminates in a radially inwardly extending leg 169 that defines an aperture 140 through which most of light assembly 110 is received. In assembly, leg 169 passed behind flange 132 which traps and retains grommet 120 (and assembly 110) onto cylindrical rim 167. A heating wire 114 is received within a groove in an inner surface of light-transmitting portion 118 of lens 116. A circumferentially spaced apart array of nipples 135 are provided about an outer surface of grommet, behind flange 132. Nipples 135 are resiliently urged within aperture 140 during assembly to further facilitate retention during assembly.

Figure 10:
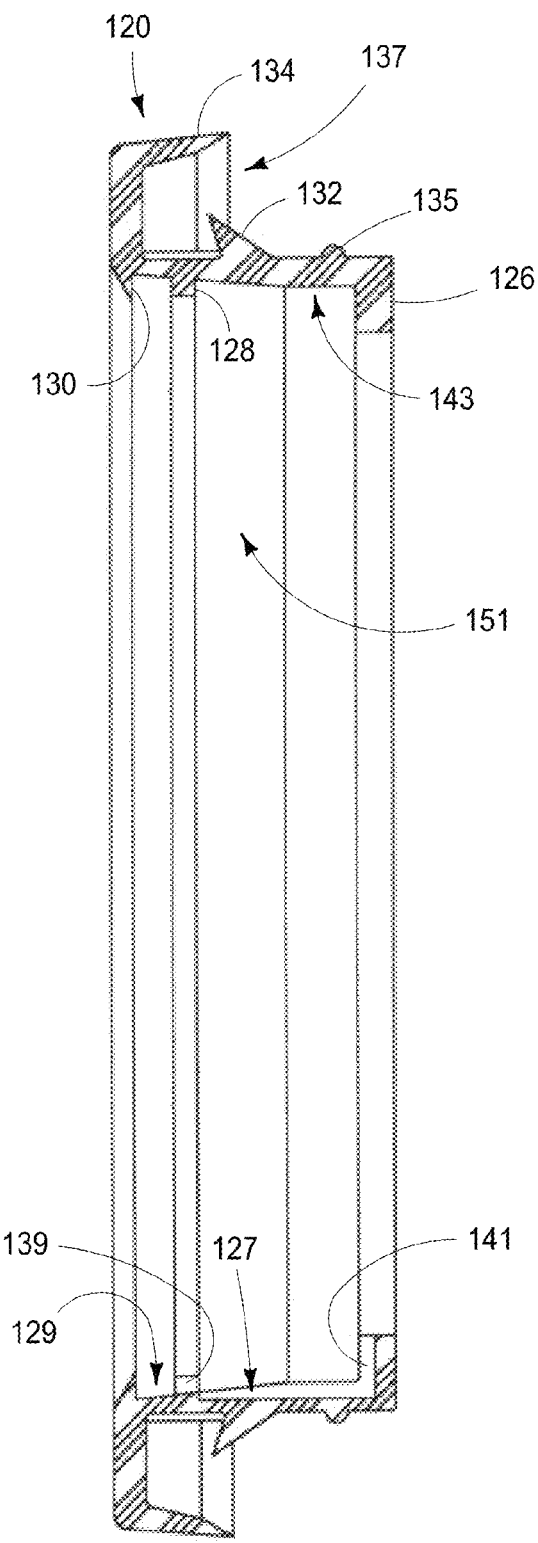
FIG. 10 is a centerline sectional view of the grommet of FIG. 9.
Figure 11:
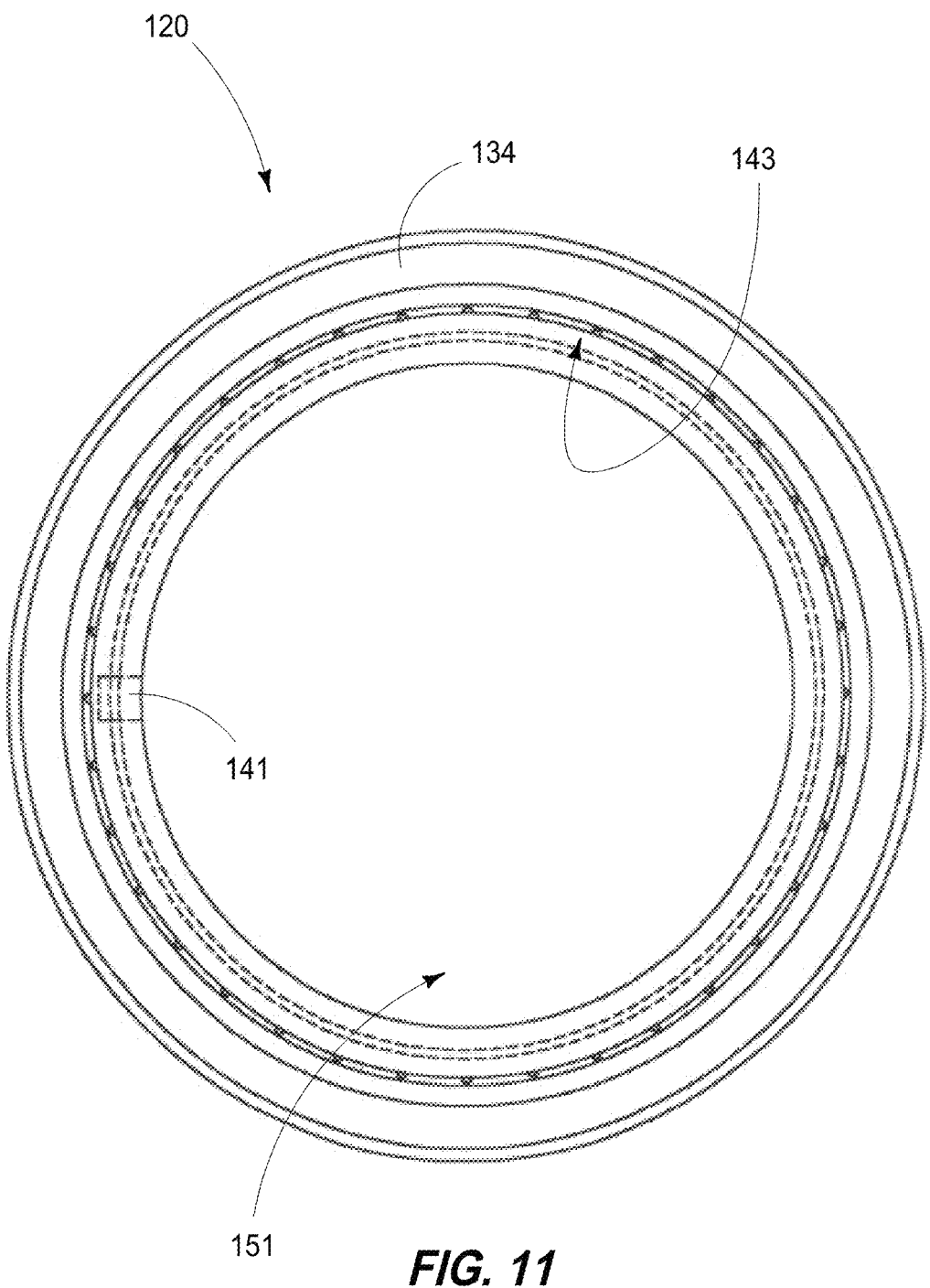
FIG. 11 is a front view of the grommet of FIG. 10.

FIG. 10 is a centerline sectional view of the grommet 120 of FIG. 9. Grooves 127 and 129 are provided between pairs of flanges 126, 128 and 128, 130, respectively. A clearance groove 139 is provided in flange 128 along with a longitudinal groove 127 (in inner surface 143) and a radial groove 144 (in flange 126) to enable routing of electrical wires to heat the lens, in assembly. Circumferential groove 137 is formed between flanges 134 and 132, outwardly (in an axial direction) of an array of nipples 135. FIG. 11 is a front view of grommet, or light retainer 120 of FIG. 10 more clearly depicting groove 141 and cavity 151

Figure 12:
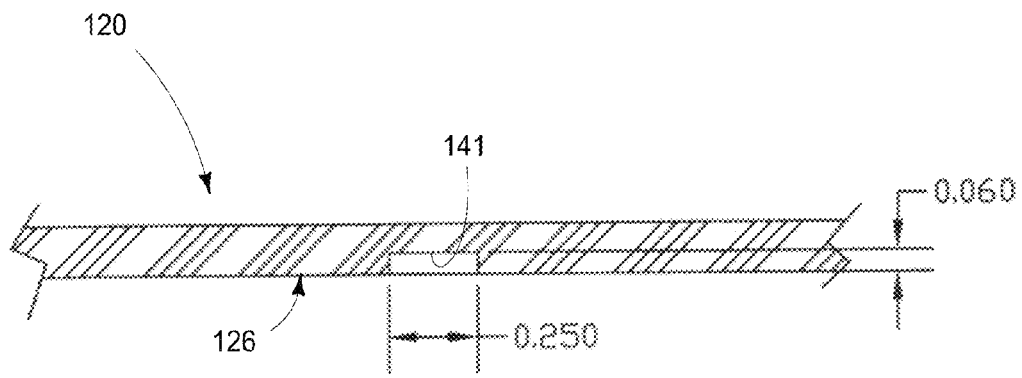
FIG. 12 is a sectional view taken along line 12-12 of FIG. 9.
Figure 13:
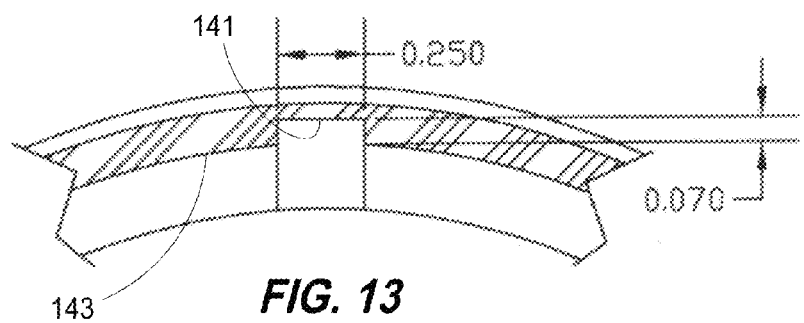
FIG. 13 is a sectional view taken along line 13-13 of FIG. 9.
Figure 14:
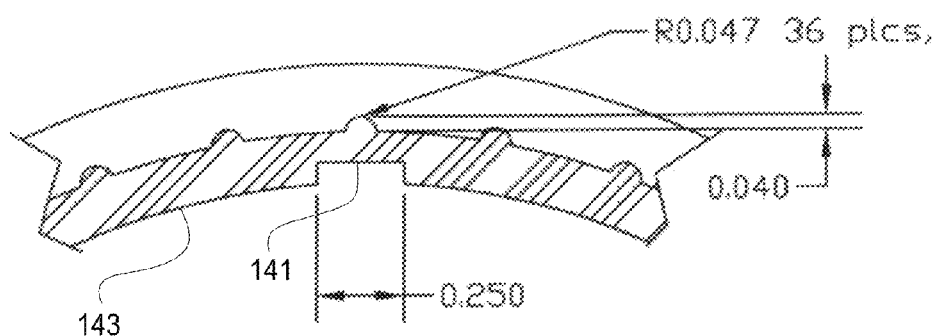
FIG. 14 is a sectional view taken along line 14-14 of FIG. 9.

FIGS. 12-14 depict groove 141 in relation to surfaces 126 and 143 of grommet 120.

Figure 15:
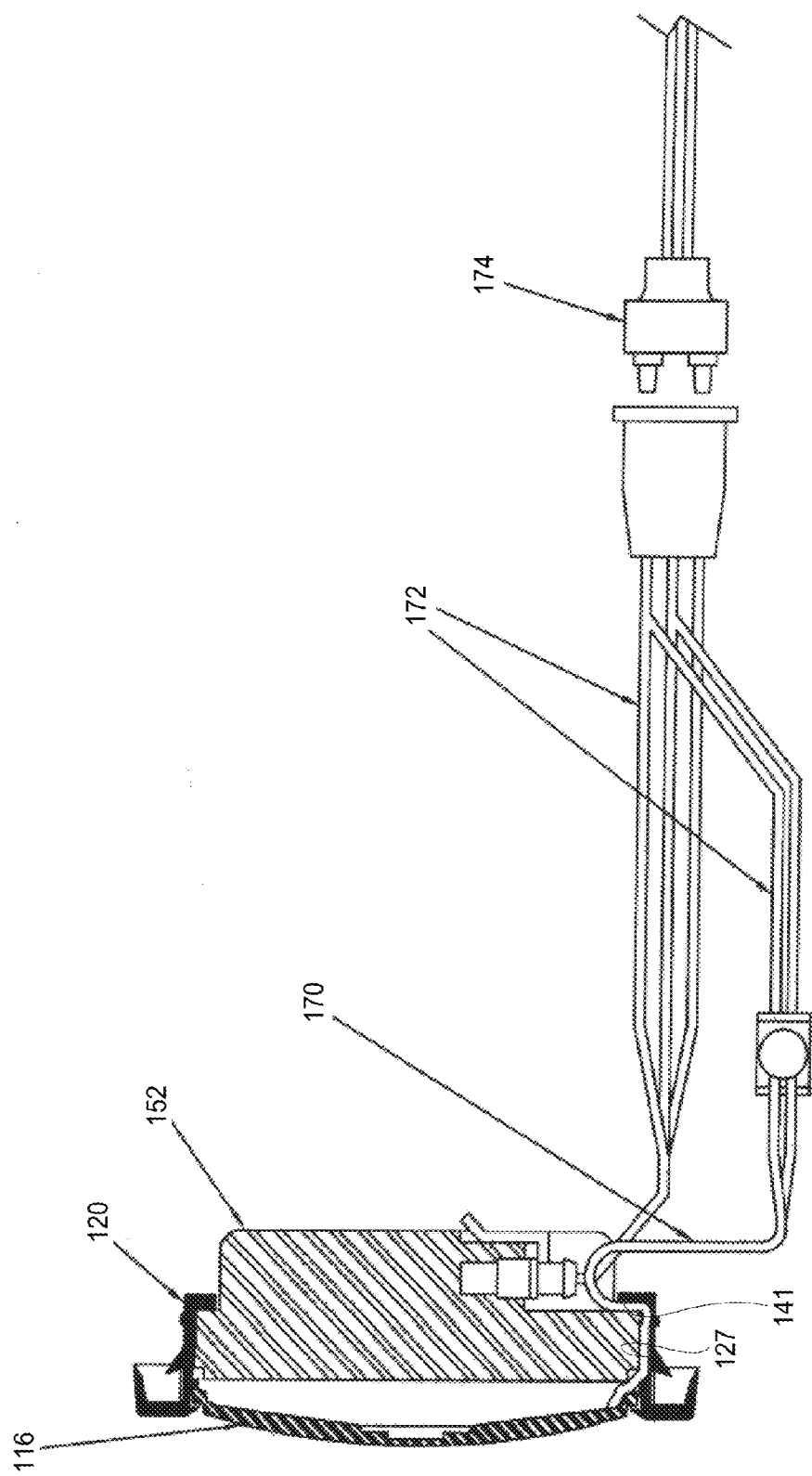
FIG. 15 is a simplified centerline sectional view of the round heated vehicle tail light assembly of FIG. 9 with a light wiring harness and lens heating element wiring harness depicted in assembly within the grommet.

FIG. 15 is a simplified centerline sectional view of the round heated vehicle tail light assembly of FIG. 9 with a light wiring harness and lens heating element wiring harness depicted in assembly within the grommet. Grooves, or cavities 127 and 141 are shown in grommet 120 to provide clearance for electrical wires 170 in assembly.

FIG. 15 further depicts a heating element wiring harness 170 provided in series with a light wiring harness 172 and a connector assembly 174 for supplying electrical power (current) to both the LED light and the heated lens of FIGS. 6-19 and 24. Both ground and tail light wires split out of a wiring harness adapter to provide ground and tail light connectors for powering the heated lens, as well as power the LED light from the vehicle power (battery and/or alternator). One branch from the wiring adapter provides plugs for the heater, and the other branch provides plugs to the LED light. Each branch is formed by a Y-branch, or electrical splitter.

Figure 16:
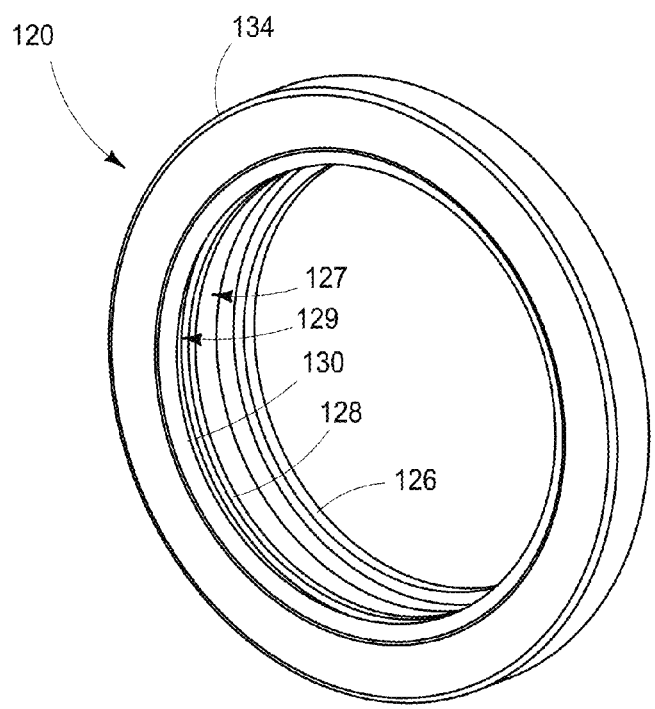
FIG. 16 a perspective view of the grommet of FIGS. 9-15.

FIG. 16 a perspective view of the grommet, or light retainer 120 of FIGS. 9-15. Circumferential grooves 127 and 129 are shown formed between flange pairs 126, 128 and 128, 130, respectively. Bezel 134 forms a radial outermost edge of grommet 120. In one version, grommet 120 is used to retain a tail light and a heated lens together. In another case, grommet 120 retains a front light or a side marker light together with a heated lens.

Figure 17:
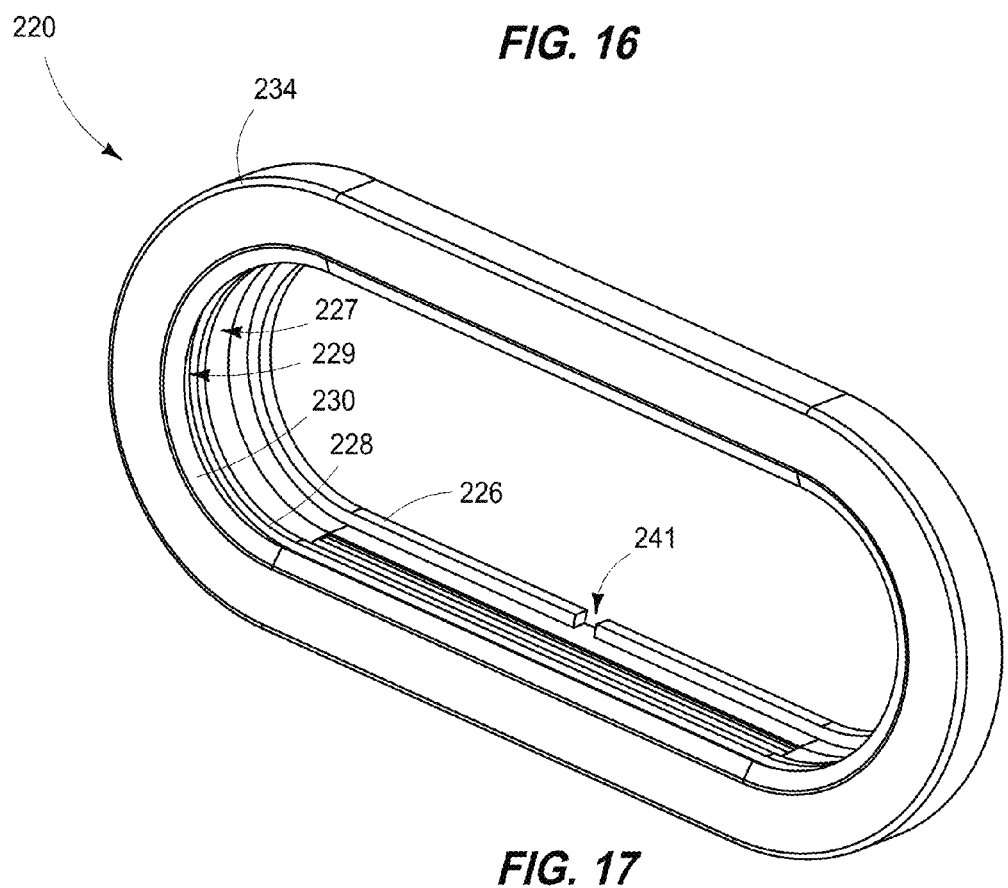
FIG. 17 illustrates in perspective view yet another version of an oval grommet for a heated tail light assembly, similar to the version depicted in FIGS. 9-16.

FIG. 17 illustrates in perspective view yet another version of an oval grommet for a heated tail light assembly, similar to the version depicted in FIGS. 9-16. Grommet, or light retainer 220 has circumferential grooves 227 and 229 that are shown formed between flange pairs 226, 228 and 228, 230, respectively. Bezel 234 forms a radial outermost edge of grommet 220. In one version, grommet 220 is used to retain a tail light and a heated lens together. In another case, grommet 220 retains a front light or a side marker light together with a heated lens.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A light retainer assembly, comprising:
    a grommet having a tubular body with an inner surface providing a cavity with a first inner groove and a second inner groove spaced lengthwise of the body from the first inner groove, the first inner groove configured to receive a heated lens and the second inner groove configured to receive a light;
    the heated lens carried by the first inner groove; and
    the light carried by the second inner groove.

2. The light retainer assembly of claim 1, wherein the tubular body comprises a pair of first and second circumferential flanges extending generally radially inwardly from the inner surface, the pair of first and second flanges spaced to receive the heated lens.

3. The light retainer assembly of claim 2, wherein the tubular body comprises a pair of second and third circumferential flanges extending generally radially inwardly from the inner surface, the pair of second and third flanges spaced to receive the light.

4. The light retainer assembly of claim 3, wherein the grommet, the heated lens, and the light cooperate to provide a heated street light.

5. The light retainer assembly of claim 3, wherein the grommet comprises a flexible elastomeric material.

6. The light retainer assembly of claim 3, wherein at least one of the first flange and the second flange is configured to provide a weatherproof seal around the heated lens when received there between.

7. The light retainer assembly of claim 3, wherein at least one of the second flange and the third flange comprises a passage provided in the flange configured to provide clearance for electrical wiring from the heated lens received between the first flange and the second flange.

8. The light retainer assembly of claim 1, wherein the tubular body is a cylindrical body with a central axis configured to mount in a round aperture of a support structure and receive a round light and round lens.

9. The light retainer assembly of claim 1, wherein the tubular body is an oval body with a central axis configured to mount in an oval aperture of a support structure and receive an oval light and an oval lens.

10. The light retainer assembly of claim 1, wherein the grommet, the light, and the heated lens provide a round vehicle tail light.

11. The light retainer assembly of claim 1, wherein the grommet comprises an elastomeric material configured to mate with an aperture rim of a vehicle.

12. A heated light assembly, comprising:
    a grommet having a tubular body with an inner surface providing a cavity with a first inner groove and a second inner groove spaced lengthwise of the tubular body from the first inner groove;
    a heated lens carried in the first groove; and
    a light carried in the second groove.

13. The heated light assembly of claim 12, wherein the tubular body comprises a pair of first and second circumferential flanges extending generally radially inwardly from the inner surface, the pair of first and second flanges spaced to receive the heated lens.

14. The heated light assembly of claim 13, wherein the tubular body comprises a pair of second and third circumferential flanges extending generally radially inwardly from the inner surface, the pair of second and third flanges spaced to receive the light.

15. The heated light assembly of claim 14, wherein at least one of the first flange and the second flange is configured to provide a weatherproof seal around the heated lens when received there between.

16. The heated light of claim 14, wherein at least one of the second flange and the third flange comprises a passage provided in the flange configured to provide clearance for electrical wiring from the heated lens received between the first flange and the second flange.

17. The heated light assembly of claim 12, wherein the grommet, the light, and the heated lens provide a round vehicle tail light.

18. The heated light assembly of claim 12, wherein the grommet, the heated light and the lens provide an oval vehicle tail light.

19. The heated light assembly of claim 12, wherein the grommet comprises an elastomeric material capable of facilitating assembly about a rigid structural aperture rim of a vehicle.

20. The heated light assembly of claim 12, wherein the grommet, the light and the heated lens provide a heated street light.

* * * * *